United States Patent [19]

Fisher et al.

[11] Patent Number: 5,023,148
[45] Date of Patent: Jun. 11, 1991

[54] TINE FILM COBALT-CONTAINING RECORDING MEDIUM

[75] Inventors: Robert D. Fisher, San Jose, Calif.; James C. Allan, Bangkok, Thailand

[73] Assignee: Seagate Technology, Inc., Scotts Valley, Calif.

[21] Appl. No.: 139,673

[22] Filed: Dec. 30, 1987

[51] Int. Cl.$^5$ .............................................. G11B 23/00
[52] U.S. Cl. ................................... 428/694; 428/611; 428/667; 428/672; 428/900
[58] Field of Search ............... 428/694, 900, 611, 678, 428/667; 427/131, 132; 204/192.15, 192.2

[56] References Cited

U.S. PATENT DOCUMENTS

| | | | |
|---|---|---|---|
| 4,202,932 | 5/1980 | Tuchen | 428/900 |
| 4,416,943 | 11/1983 | Saito | 428/900 |
| 4,452,864 | 6/1984 | Kitahara et al. | 428/900 |
| 4,542,062 | 9/1985 | Takada et al. | 428/900 |
| 4,552,820 | 11/1985 | Lin et al. | 428/611 |
| 4,599,280 | 7/1986 | Izumi et al. | 428/900 |
| 4,610,911 | 9/1986 | Opfer et al. | 428/900 |
| 4,673,610 | 6/1987 | Shirahata et al. | 428/694 |

FOREIGN PATENT DOCUMENTS 58-113340 7/1983 Japan .
60-83218 5/1985 Japan .

OTHER PUBLICATIONS

Yamata, et al., *IEEE Transactions on Magnetics*, vol. MAG-21 (5), 1429, Sep. 1985.
Fisher, et al., *IEEE Transactions on Magnetics*, vol. MAG-22 (5), 352, Sep. 1986.
Allan, et al., *IEEE Transactions on Magnetics*, vol. MAG-23 (1), 122, Jan. 1987.
*IEEE Transactions on Magnetics* vol. Mag-20-No. 5 Sep. 1984.

Primary Examiner—Paul J. Thibodeau
Attorney, Agent, or Firm—Flehr, Hohbach, Test, Albritton & Herbert

[57] ABSTRACT

The present invention provides novel magnetic recording media wherein the magnetic recording material is an alloy consisting essentially of a major amount of cobalt and either or both of a minor amount of a nonmagnetic element soluble in cobalt which reduces the face-centered cubic phase, or a minor amount of another element which increases the coercive force of the alloy by isolating grain boundaries. The presence of either or both of these additives increases the coercive force of the alloy with attendant improvement in digital recording performance.

5 Claims, 3 Drawing Sheets

TINE FILM COBALT-CONTAINING RECORDING MEDIUM

The present invention is directed to novel cobalt-containing recording media which are advantageous for high-performance digital magnetic recording.

BACKGROUND OF THE INVENTION

The recording performance of a magnetic recording member is primarily determined by its magnetic properties, specifically the coercive force, remanence, and thickness of the recording member. These magnetic properties determine the signal amplitude, frequency response, resolution and overwrite characteristics of the recording disc members. There are two general types of recording media namely (1) binary electroless or electrodeposited cobalt-nickel alloys (containing a certain amount of phosphorus); (2) sputtered binary cobalt-chromium alloys and ternary alloys such as cobalt-nickel-chromium alloys and cobalt-chromium-tantalum alloys. Consequently, the choice of magnetic materials for digital recording applications is limited.

The signal amplitude and the intrinsic error rate for digital recording media are determined by the head/media interface, the areal density requirement and the data code characteristics. Therefore, compromises must be invoked due to limited media selection as well as disc costs associated with the process of manufacturing such as sputtering, electroless plating or electroplating. The latter processes, namely electroless and electroplating, are primarily restricted to cobalt-nickel alloys whereas sputtering processes are completely flexible relative to the composition of the magnetic media, i.e., nearly any metallic film, or dielectric material may be sputtered either by DC or RF magnetron sputtering. The magnetic properties of sputtered magnetic materials are dependent upon the deposition process parameters, e.g., in the a typical case of sputtered films of 84% Co-16% Cr the argon flow, pressure, and temperature of the substrates are critical in determining the coercive force of the media.

There are two allotropic modifications of cobalt, namely a close packed hexagonal form (hcp phase) stable at temperatures below 417° C. and a face-centered cubic form (fcc phase) stable at higher temperatures up to the melting point (1495° C.). For the latter form, however, a controversy exists as to its stability primarily as a result of the relatively low free energy change associated with the fcc to hcp phase transformation of cobalt. Heidenrich and Shockley (*Strength of Solids*, The Physical Soc., London, 1955, p. 274) estimated from the transition temperature that the free energy involved in the transformation of hcp to fcc phase is about 100 cal/g-atom. Using the concept that a stacking fault in a fcc metal may be considered as a platelet of hcp material (and vice versa), these authors calculated that the stacking fault energy was about 20 ergs/sq. cm. which is extremely small.

The low energy involved in the structural change of cobalt will often enable small energy changes associated with many metallurgical accidents or processes to have a significant influence on the allotropic transformation of this element, e.g., R. D. Fisher, "Influence of Residual Stress on the Magnetic Characteristics of Electrodeposited Cobalt and Nickel", *J. Electrochem. Soc.*, V 109, No. 6, 1962, has reported face-centered cubic cobalt phases in conjunction with hexagonal phases in electrodeposited cobalt and Kersten, "Influence of the Hydrogen Ion Concentration on the Crystal Structure of Electrodeposited Cobalt", *Physics*, 2 (1932), found that the hexagonal structure of cobalt electrodeposited from a high pH sulfate solution changes to a mixture of hexagonal and cubic structures as the pH is decreased. R. D. Fisher, et al. (*IEE Transactions on Magnetics*, 22 (5), 352–354 (September 1986)) described magnetic properties, recording performance and corrosion resistance of certain sputtered Co-Cr and Co-Cr-Ta alloy films and related coercive forces of the films to the anisotropy energy which, in turn, is related to the crystalline orientation and stacking fault characteristics of the hcp phase or structure.

However, there has heretofore not believed to have been disclosed a basic approach for developing sputtered alloys with high coercive forces for high-performance magnetic recording applications by other than empirical determination of proper deposition process parameters.

It is thus an object of the present invention to provide novel classes of magnetic recording media with high coercive force for high-performance magnetic recording applications.

SUMMARY OF THE INVENTION

The present invention provides novel magnetic recording media comprising a substrate member and a film of magnetic recording material, wherein the magnetic recording material comprises, in one instance, an alloy consisting essentially of a major amount of cobalt and a minor amount of a nonmagnetic element soluble in cobalt selected from the group consisting of silicon, rhodium, titanium, molybdenem, niobium, tantalum, iron, rhenium, platinum and tungsten, and wherein the nonmagnetic element is present in an amount no greater than the solubility limit of that element in cobalt. In another embodiment of the invention, magnetic recording media are provided comprising a substrate member and a film of magnetic recording material wherein the material comprises cobalt, or cobalt nickel alloy, with or without a minor amount of the aforementioned soluble nonmagnetic film, but further containing a minor amount of a nonmagnetic element insoluble in cobalt selected from the group consisting of rubidium, silver, cadmium, bismuth, tellurium, selenium, phosphorus, tin, niobium, zinc, gold, carbon, vanadium and aluminum. The above alloys are provided as films or coatings by conventional sputtering techniques controlled so as to provide the predetermined composition according to the teachings of the present invention.

DESCRIPTION OF THE PREFERRED EMBODIMENTS

Figure 1:
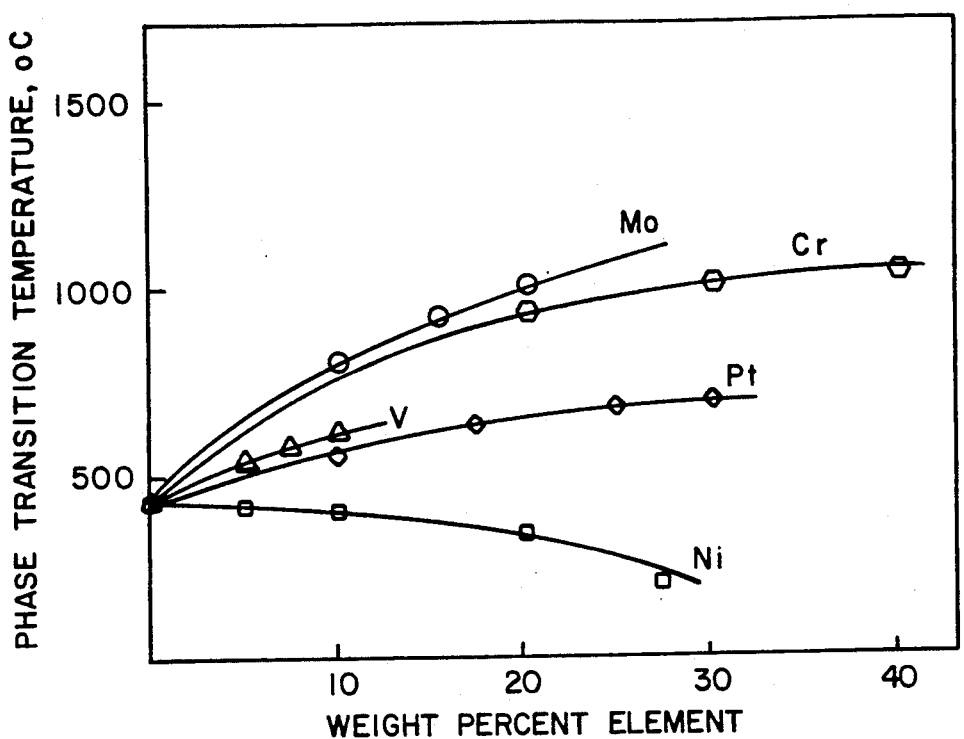
FIG. 1 is a graph of the phase transition temperature as a function of weight percent added of four different elements for binary cobalt alloys.

It is recognized that the existence of a mixture of fcc and hcp phases in cobalt or a cobalt-nickel alloy will reduce the coercive force significantly since the cubic phase has a significantly lower anisotropy energy than the hcp phase, e.g., hcp cobalt exhibits a uniaxial anisotropy equivalent to $60 \times 10^6$ ergs/cubic cm.. However, the fcc phase exhibits an anisotropy three orders of magnitude less in the range of $10^3$ ergs/cubic cm., e.g., nickel (fcc) exhibits an anisotropy energy of $20 \times 10^3$ ergs/cubic cm. The coercive force ($H_c$) is related to the anisotropy field ($H_k$) of the magnetic material by the relation:

$$H_c = 0.117 H_k \text{ (G. Hughes, } J. \text{ } Appl. \text{ } Phys., 54 \text{ (1983))} \quad (1)$$

However, it is well known that $H_k = 2 K/M_s$ where K is the anisotropy constant and $M_s$ is the saturation magnetization. Consequently, high coercive force requires a high anisotropy energy and low saturation magnetization. The former requires a close packed hexagonal element such as cobalt or cobalt alloys. However, the fcc phase must be minimized or the hcp phase must be maximized in order to obtain high anisotropy energy.

Furthermore, an increase in coercive force is obtainable by isolating grain boundaries in order to promote semiparticulate magnetic behavior. According to the present invention, this may be accomplished by addition of a nonmagnetic element which is insoluble in cobalt or the cobalt alloy. While not intending to be bound by a theory, the increase in coercive force is believed to be due to the rotational switching behavior of thin films which have a greater coercive force than films which switch or reverse the magnetization by means of domain wall motion. Cobalt alloys generally exhibit negative magnetostriction characteristics. Consequently, such alloys are sensitive to the magnitude and sign of the internal stress and to variations of the internal stress. Therefore, the coercive force may be expressed as:

$$H_c = 0.234 K/M_s + 1.437(-\lambda)(\sigma)/M_s \quad (2)$$

where $\lambda$ is the isotropic magnetostriction coefficient, and $\sigma$ is internal stress. It should be realized that most cobalt alloys exhibit a negative magnetostriction value as indicated in the above equation. Consequently, a compressive internal stress (negative $\sigma$ value) may increase the coercive force, i.e., the second term on the right side of the equation (2) adds to the first term. If the internal stress is tensile (positive $\sigma$ value) then the second term on the right side of equation (2) substracts from the first term and the coercive force will decrease. The coercive force of a given composition is dependent on the deposition or process conditions, e.g., a low sputtering pressure contributes to a compressive stress, since argon (or other inert carrier gas) atoms are entrapped in the film. A high pressure may result in a tensile stress due to dislocations and lattice vacancies. However, the basic coercive force is determined by the first term, as discussed, relative to the values of the anistropy constant (K) and by the degree of grain boundary isolation. The value of K is determined by the volume fraction of fcc phase relative to hcp phase, manifested by the phase transition temperature. The extent of grain boundary isolation is determined by amount of insoluble nonmagnetic elements present. However, cobalt-nickel alloys may exhibit zero magnetostriction providing the alloy composition consists of about 75 atomic percent cobalt and about 25 atomic percent nickel. Therefore, addition of an insoluble nonmagnetic element to such an alloy will not only raise the coercive force but will provide a composition which is insensitive to the internal stress characteristics.

Accordingly, in one preferred embodiment, the magnetic recording medium will comprise a substrate and a film or coating of a magnetic recording material comprising an essentially homogeneous, nonparticulate alloy consisting essentially of a major amount of cobalt and a minor amount of a nonmagnetic element soluble in cobalt selected from the group consisting of silicon, rhodium, titanium, molybdenum, niobium, tantalum, iron, rhenium, platinum and tungsten. The nonmagnetic element will be present in an amount no greater than the solubility limit of the element in cobalt. These elements raise the phase transformation temperature of cobalt and reduce the fcc phase relative to the hcp phase. Furthermore, to the extent that these nonmagnetic soluble elements have limited solubility in cobalt, such as tungsten (13.5 atomic percent solubility in cobalt), molybdenum (15.5 atomic percent solutility), and tantalum (5.0 atomic percent solubility), these elements are added in an amount which does not exceed their solubility limits in order to decrease the fcc phase with respect to the hcp phase.

In another preferred embodiment, the aforementioned soluble nonmagnetic elements are added to cobalt in amounts which exceed their solubility limit. While not intending to be bound by any particular theory, it is believed that when any one or a combination of the above soluble elements are added to cobalt, to the extent they are soluble in cobalt, it will decrease the fcc phase relative to the hcp phase, but the excess insoluble amounts will then move to grain boundaries in the microstructure, resulting in a further increase in coercive force as a result of grain boundary isolation.

Examples of the types of alloys which contain a soluble nonmagnetic element present in an amount no greater than its solubility limit in cobalt include, but are not limited to:

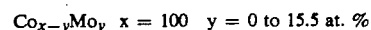
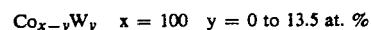
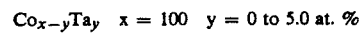

$Co_{x-y}Mo_y \quad x = 100 \quad y = 0 \text{ to } 15.5 \text{ at. } \%$
$Co_{x-y}W_y \quad x = 100 \quad y = 0 \text{ to } 13.5 \text{ at. } \%$
$Co_{x-y}Ta_y \quad x = 100 \quad y = 0 \text{ to } 5.0 \text{ at. } \%$ Examples of alloys containing a soluble nonmagnetic element in excess of its solubility limit in cobalt include, but are not limited to:

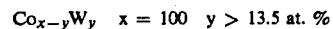
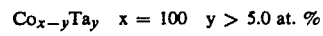
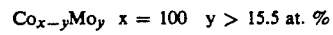

$Co_{x-y}W_y \quad x = 100 \quad y > 13.5 \text{ at. } \%$
$Co_{x-y}Ta_y \quad x = 100 \quad y > 5.0 \text{ at. } \%$
$Co_{x-y}Mo_y \quad x = 100 \quad y > 15.5 \text{ at. } \%$ According to a further embodiment of the present invention, the essentially homogeneous, nonparticulate magnetic recording medium comprises cobalt and a minor amount of a nonmagnetic element which is insoluble in cobalt selected from the group consisting of rubidium, silver, cadmium, bismuth, tellurium, selenium, phosphorus, tin, niobium, zinc, gold, carbon, vanadium and aluminum. While not intending to be bound to a particular theory, it is believed that these insoluble elements move to the grain boundaries of the cobalt or cobalt alloy and consequently increase the coercive force. This modification may be utilized with both cobalt and alloys of cobalt with an element soluble in cobalt. Accordingly, compositions according to this embodiment may contain a minor amount of at least two elements selected from the group consisting of silicon, rhodium, titanium, molybdenum, niobium, iron, rhenium and platinum, wherein at least one of these elements is present in an amount in excess of its solubility limit in cobalt. Preferably, the amount of insoluble element will not exceed 16 atomic % of the alloy. Particularly preferred alloy compositions are those containing 20 atomic % or less of the insoluble elements aluminum or tin. For alloy compositions containing two soluble nonmagnetic elements, preferred alloys are cobalt-tungsten-tantalum and cobalt-molybdenum-tantalum, particularly, 81.5 at. % Co/13.5 at. % W/5 at. % Ta and 79.5 at. % Co/15.5 at. % Mo/5 at. % Ta.

In yet another modification, a magnetic recording medium may be made comprising cobalt and a minor amount of a nonmagnetic soluble element selected from the group consisting of silicon, chromium, rhodium, titanium, molybdenum, niobium, tantalum, iron, rhenium, platinum and tungsten and a minor amount of an insoluble nonmagnetic element selected from the group consisting of rubidium, silver, cadmium, bismuth, tellurium, selenium, phosphorus, tin, niobium, zinc, gold, carbon, vanadium and aluminum. Particularly preferred alloy compositions are cobalt-chromium-aluminum and cobalt-chromium-tin alloys, particularly 84 at. % Co/14 at. % Cr/2 at. % Al and 84 at. Co/14 at. % Co/2 at. % Sn. In this embodiment, the non-magnetic soluble elements, to the extent present in an amount less than their solubility limit in cobalt, serve to minimize the fcc phase with respect to the hcp phase and the nonmagnetic insoluble element serves to isolate the grain boundaries. Preferably, the total of the soluble and insoluble non-magnetic elements will not exceed 16 atomic % of the alloy. Most preferably, the total amount of the insoluble element alone will not exceed 16 atomic %.

In yet another embodiment, a cobalt-chromium alloy may be utilized containing a minor amount of a soluble nonmagnetic element selected from the group consisting of silicon, chromium, rhodium, titanium, molybdenum, niobium, iron, rhodium, platinum and tungsten wherein the soluble element is present in an amount exceeding its solubility limit in cobalt.

Examples of those cobalt alloys containing an insoluble nonmagnetic element or two or more soluble nonmagnetic elements include, but are not limited to, the following:

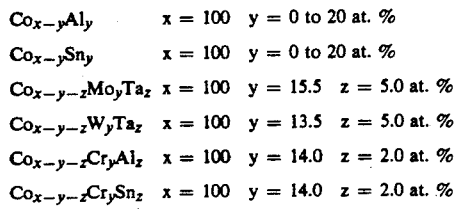

Preferably, the insoluble nonmagnetic element will not exceed 16 atomic % of the alloy.

In yet another embodiment of the present invention, a cobalt-nickel alloy containing a minor amount of an insoluble nonmagnetic element selected from the group consisting of rubidium, silver, cadmium, bismuth, tellurium, selenium, phosphorus, tin, niobium, zinc, gold, carbon, vanadium and aluminum, is utilized upon a substrate. Since nickel is soluble in cobalt, the insoluble nonmagnetic element serves to isolate grain boundaries, thus further increasing the coercive force. Examples of the cobalt-nickel alloys containing an insoluble element include, but are not limited to, the following:

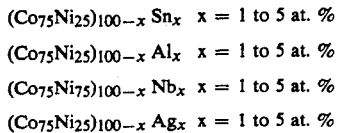

The solubility limits of the various elements in cobalt are known. Therefore, the films and coatings made in accordance with the present invention may be made by sputtering methods whereby the desired composition limits of each component may be readily controlled. Sputtering techniques are well known, such as dc or rf magnetron sputtering or cathodic arc, and any one of the conventional techniques may be utilized to form the coatings in accordance with the present invention. In the usual circumstances, bombardment of the electrodes, such as by ion plasma, causes the target material to be sputtered therefrom and collected upon the substrate. The substrate material according to the present invention may be any material which is compatible for receiving cobalt and cobalt alloys such as molybdenum, titanium, chromium, niobium, tantalum, vanadium and tungsten. The substrate is preferably first cleaned and may be overcoated with primary coatings and/or strengthening layers, such as electroless nickel and chromium.

Preferably, the film of magnetic recording material will be deposited upon a substrate formed of an aluminum base, an electroless nickel layer, and a final chromium layer. Alternatively, if a ceramic or glass base is utilized, then the electroless nickel layer may be omitted and the substrate may simply comprise the base with a chromium overlayer.

Particularly preferred methods for depositing the film of magnetic recording material are by dc or rf magnetron sputtering at subatmospheric pressure, usually at less than 50 milliTorr.

In most instances, the coating or film according to the present invention will be sputter-deposited to a thickness of between about 400 and 1200 Å and preferably to a thickness of approximately 750 Å.

As set forth above, the alloys according to the present invention, when used as magnetic recording media, are advantageous due to their elevated phase transition temperatures. In order to best utilize the invention in the case in which the phase transition temperature is raised by the addition of soluble nonmagnetic material, which minimizes the fcc with respect to the hcp phase, reference is made to FIG. 1, which shows the phase transition temperature as a function of weight percent added of molybdenum, chromium, vanadium, platinum, or nickel in a binary cobalt alloy.

Other examples of the present invention are given below for the purposes of illustration and are not intended to be limiting to the invention in any way.

EXAMPLE I

Figure 2:
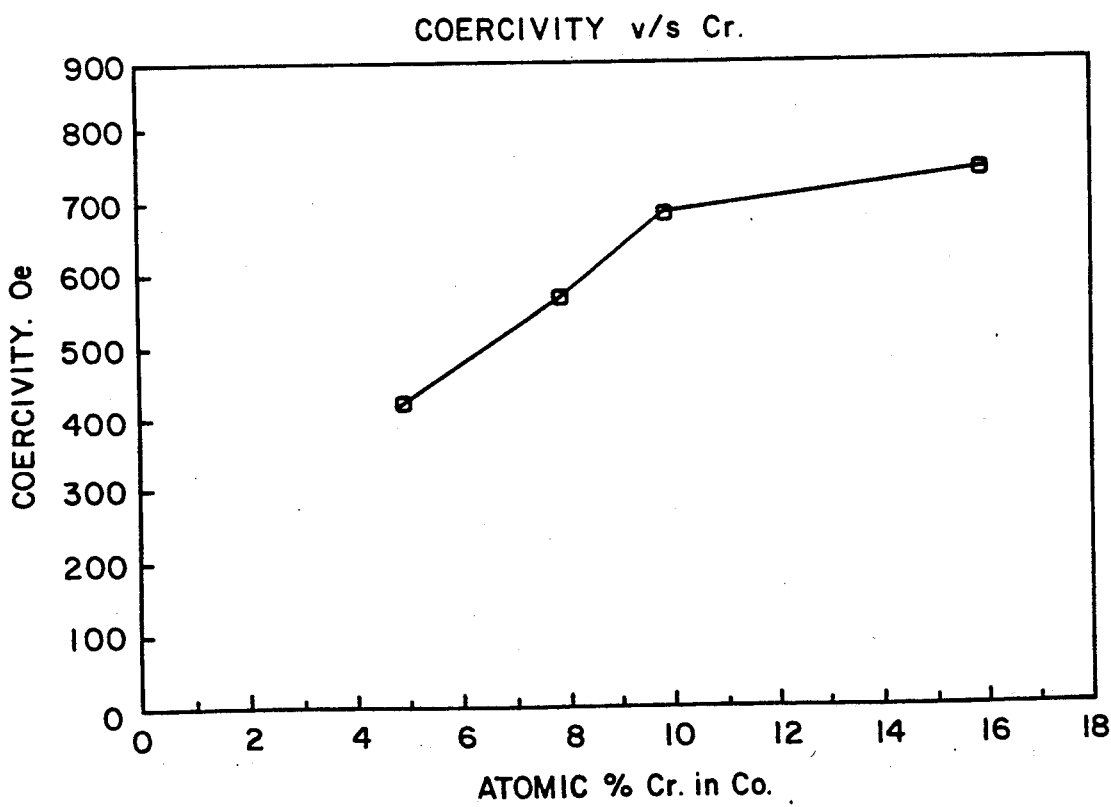
FIG. 2 is a graph of the coercive force of cobalt alloys as a function of chromium content.
Figure 3:
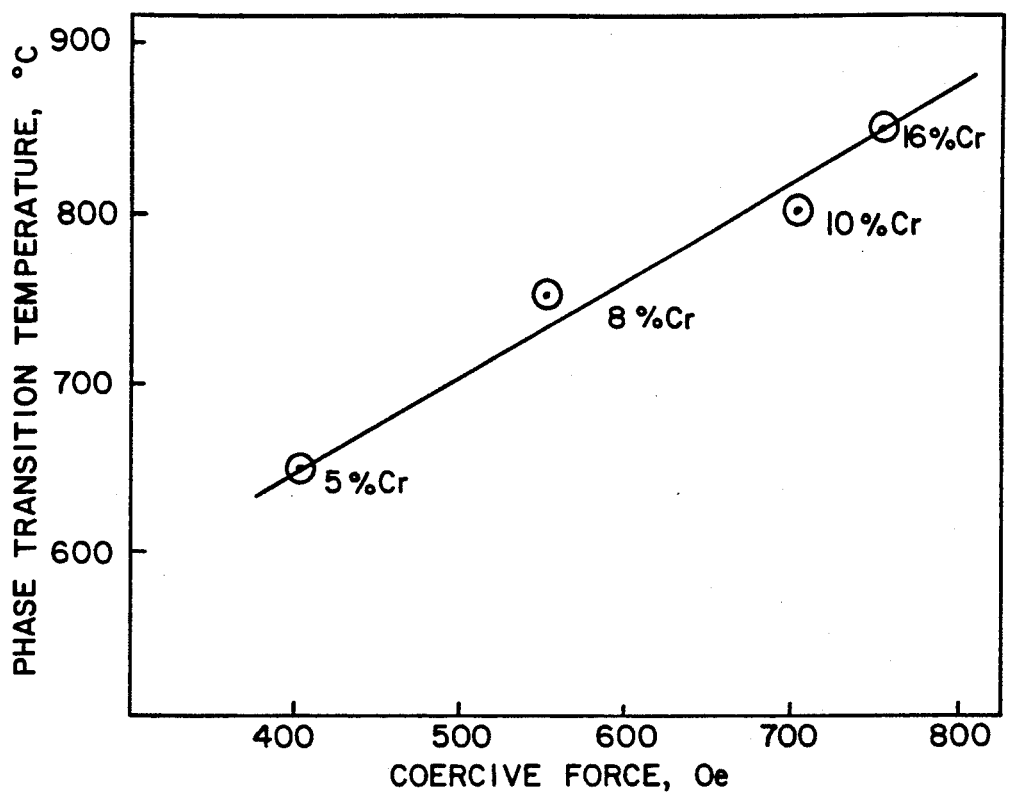
FIG. 3 is a graph of the coercive force of binary alloys of the CoCr versus phase transition temperature.

Cobalt-chromium alloy films were sputtered utilizing a DC magnetron sputtering system. Substrates consisted of aluminum base metal coated with electroless nickel (Ni—P) followed by sputtered chromium at a thickness of 2500 Angstroms. The sputtering conditions were essentially 10 milliTorr, at a rate of 15 Angstroms/second with a substrate temperature of 250° C. The initial background pressure prior to sputtering was in the range of 10 to the minus 6 Torr ($10^{-6}$). FIG. 2 shows the influence of atomic Percent chromium on the coercive force of sputtered alloys at a fixed thickness of 900 Angstroms. The coercive force is nearly a linear function of the Cr content. FIG. 3 shows a detailed plot of the phase transition temperature as a function of the coercive force for various CoCr alloys. The results indicate that the coercive force is a linear function of the phase transition temperature as previously described. The results are also conveniently shown in the table below:

| At. % Cr | Coercive Force | Transition Temperature |
|---|---|---|
| 5.0 | 400 oe | 650° C. |
| 8.0 | 550 | 750° C. |
| 10.0 | 700 | 800° C. |
| 16.0 | 750 | 850° C. |

Therefore, as previously discussed, increasing the phase transition temperature results in an increase in coercive force.

EXAMPLE II

Figure 4:
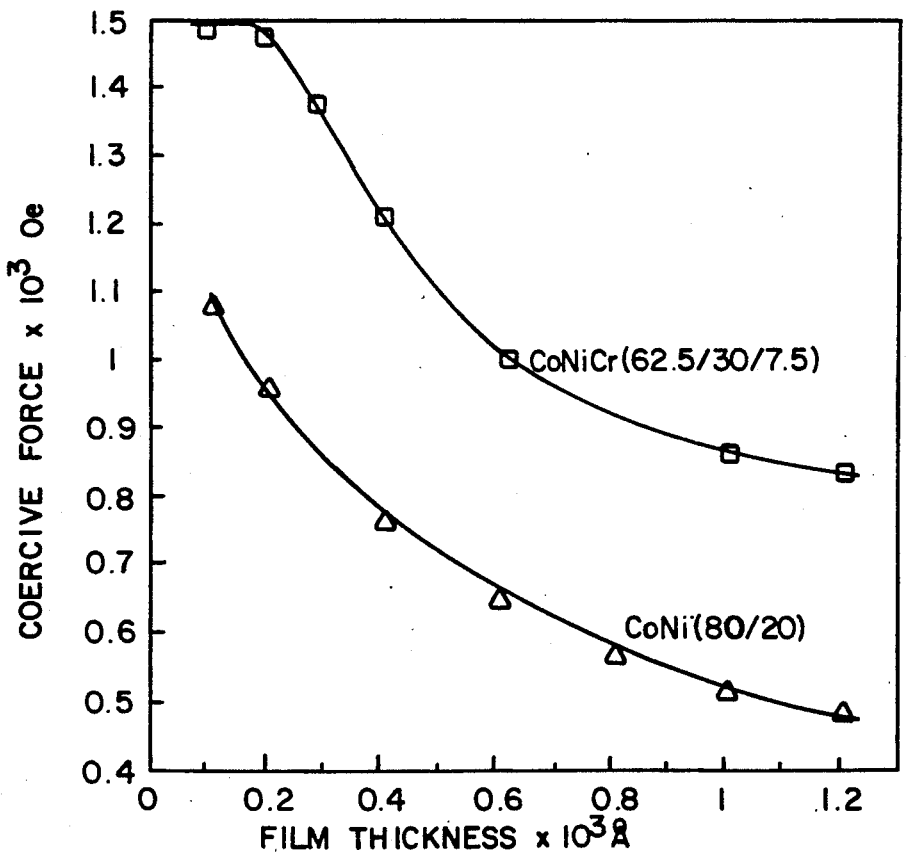
FIG. 4 is a graph of coercive force as a function of film thickness for two cobalt alloys.

As shown in FIG. 1, additions of Ni to cobalt have little affect on the phase transition temperature below about 12.5 at. % Ni, but at values greater than 12.5 at. % Ni the phase transition temperature decreases with increasing nickel. However, additions of Cr to CoNi alloys would increase the phase transition temperature in a similar manner as in the case of cobalt, since nickel is completely soluble in cobalt. Therefore, CoNiCr alloy films may be expected to exhibit greater coercive force values than sputtered CoNi alloys, for example, films of 62.5 at % Co/30.0 at. % Ni 7.5 at. % Cr and 80 at. % Co/20 at. % Ni were prepared under similar sputtering conditions as Example I. The CoNiCr films exhibited greater coercive force than CoNi alloy films as shown in FIG. 4.

EXAMPLE III

Figure 5:
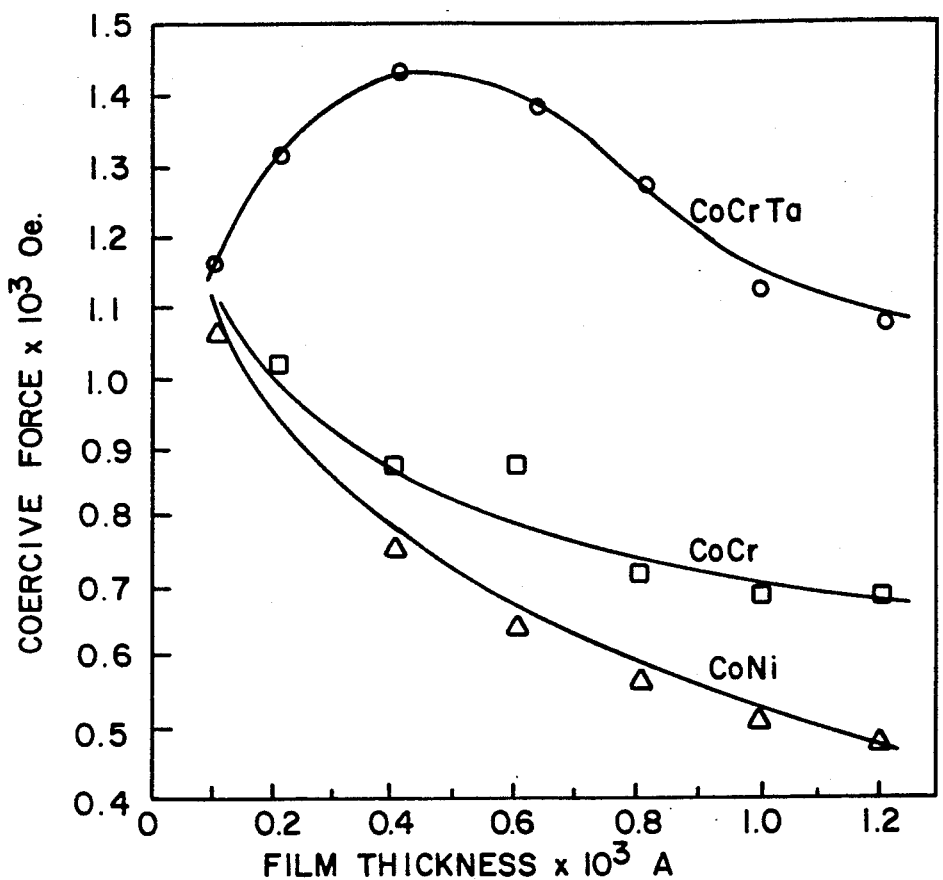
FIG. 5 is a graph of coercive force as a function of thickness for three cobalt alloys.

Additions of Cr and/or Ta to cobalt will increase the phase transition temperature (FIG. 1, and/or Table I). Consequently, sputtered films of CoNi (80at. % Co/20 at. % Ni), CoCr (84at. %/16at. % Cr) and CoCrTa (86at. % Co/12at. % Cr/2 at. % Ta) were prepared utilizing a Dc magnetron sputtering system. The sputtering conditions were the same as those described in Example I. The coercive force of CoNi films, CoCr films and CoCrTa films are shown in FIG. 5. It can be seen as expected that the coercive force of Co films containing Cr which is greater than Co films containing nickel as expected.

EXAMPLE IV

Figure 6:
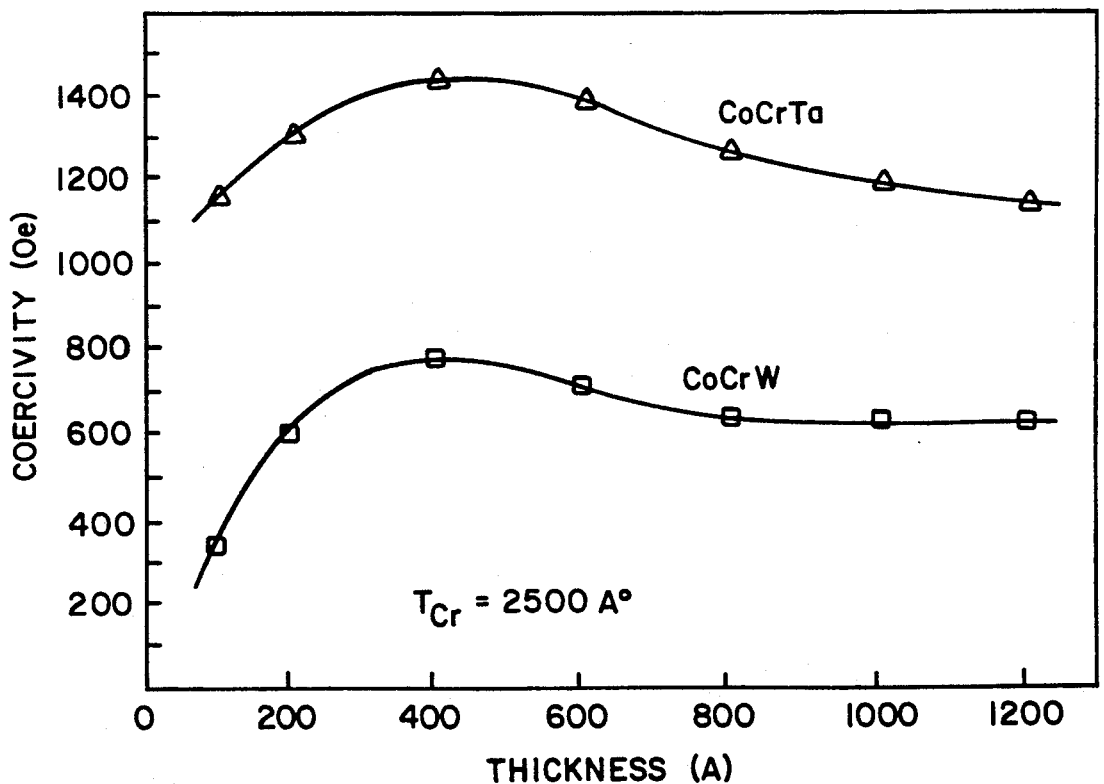
FIG. 6 is a graph of coercive force as a function of thickness for two cobalt alloys.

Ternary Co alloys containing Cr and Ta were compared to ternary alloys of Co containing Cr and W. Both Ta and W raise the phase transition temperature. The film compositions were Co-19at. % Cr/2at. % W and Co-12 at. % Cr/2at. % Ta. The sputtering conditions were similar to those described in Example I. FIG. 6 shows the coercive force of these films as a function of thickness. The ternary alloy containing Cr and Ta exhibited greater coercive force values than Co alloy containing Cr and W. However, both exhibit high coercive force values in comparison to CoNi alloys.

While the invention has been described in detail with reference to specific embodiments thereof, it will be apparent to one skilled in the art that various changes and modifications can be made therein without departing from the spirit and scope of the invention. This is particularly obvious relative to the binary as well as to the ternary alloys containing an insoluble and/or soluble nonmagnetic element which may be varied considerably relative to their percentage combinations.

What is claimed is:

1. A magnetic recording medium comprising a substrate member having a chromium surface and a film of magnetic recording material over said chromium surface wherein said magnetic recording material comprises an alloy comprising 13.5 atomic percent tungsten, 5.0 atomic percent tantalum and 81.5 atomic percent cobalt.

2. A magnetic recording medium comprising a substrate member having a chromium surface and a film of magnetic recording material over said chromium surface wherein said magnetic recording material comprises an alloy comprising 14.0 atomic percent chromium, 2.0 atomic percent tin and 84.0 atomic percent cobalt.

3. A magnetic recording medium comprising a substrate member having a chromium surface and a film of magnetic recording material over said chromium surface wherein said magnetic recording material comprises an alloy of the formula $[(Co_{75}Ni_{25})_{100-x}]Y_x$ wherein Y is tin and x is less than 5 atomic percent but greater than 1.0 atomic percent.

4. A magnetic recording medium comprising a substrate member having a chromium surface and a film of magnetic recording material over said chromium surface wherein said magnetic recording material comprises an alloy of the formula $[(Co_{75}Ni_{25})_{100-x}]Y_x$ wherein Y is silver and x is less than 5 atomic percent but greater than 1.0 atomic percent.

5. A magnetic recording medium comprising a substrate member having a chromium surface and a film of magnetic recording material over said chromium surface wherein said magnetic recording material comprises an alloy of the formula $[(Co_{75}Ni_{25})_{100-x}]Y_x$ wherein Y is aluminum and x is less than 5 atomic percent but greater than 1.0 atomic percent.

* * * * *

UNITED STATES PATENT AND TRADEMARK OFFICE
CERTIFICATE OF CORRECTION

PATENT NO. : 5,023,148

DATED : June 11, 1991

INVENTOR(S) : Robert D. Fisher and James C. Allan

It is certified that error appears in the above-identified patent and that said Letters Patent is hereby corrected as shown below:

Cover Page at [54], please correct the Title to read as follows:

"THIN FILM COBALT-CONTAINING RECORDING MEDIUM"

Signed and Sealed this

Twenty-ninth Day of September, 1992

Attest:

DOUGLAS B. COMER

*Attesting Officer*      *Acting Commissioner of Patents and Trademarks*